United States Patent
Zhu et al.

(10) Patent No.: US 8,996,844 B1
(45) Date of Patent: *Mar. 31, 2015

(54) APPARATUS AND METHOD FOR ACCESSING NON-OVERLAPPING PORTIONS OF MEMORY ACCORDING TO RESPECTIVE ORDERS OF DIMENSIONS

(71) Applicant: Marvell International Ltd., Hamilton (BM)

(72) Inventors: Jun Zhu, San Jose, CA (US); Joseph Jun Cao, Los Gatos, CA (US); Samitinjoy Pal, Santa Cruz, CA (US); Hongyan Liu, Palo Alto, CA (US); Can Ma, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,817

(22) Filed: Dec. 27, 2013

Related U.S. Application Data

(63) Continuation of application No. 13/826,665, filed on Mar. 14, 2013, now Pat. No. 8,621,181, which is a continuation of application No. 12/903,055, filed on Oct. 12, 2010, now Pat. No. 8,402,249.

(60) Provisional application No. 61/253,019, filed on Oct. 19, 2009.

(51) Int. Cl.
*G06F 12/10* (2006.01)
*G06F 12/02* (2006.01)

(52) U.S. Cl.
CPC ................................. *G06F 12/0207* (2013.01)
USPC ........................................... 711/209; 711/173

(58) Field of Classification Search
None
See application file for complete search history.

(56) References Cited

U.S. PATENT DOCUMENTS

| | | |
|---|---|---|
| 5,469,559 A | 11/1995 | Parks et al. |
| 6,192,463 B1 | 2/2001 | Miltra et al. |
| 6,226,724 B1 | 5/2001 | Biggs |
| 6,249,837 B1 | 6/2001 | Tsuchiya et al. |
| 6,505,269 B1 | 1/2003 | Potter |
| 6,738,889 B2 | 5/2004 | Godtland et al. |
| 7,096,340 B1 | 8/2006 | Snyder et al. |
| 8,108,596 B2 | 1/2012 | Aldworth et al. |

*Primary Examiner* — Gary Portka

(57) ABSTRACT

A system including a storage device and a controller. The storage device is configured to store a map. The map relates (i) a first portion of a memory to a first order of first dimensions, and (ii) a second portion of the memory to a second order of second dimensions. The first portion of the memory and the second portion of the memory are non-overlapping. Each of the first dimensions and each of the second dimensions has corresponding memory cells in the memory. The controller is configured to control access to the first portion of the memory according to the first order of first dimensions while controlling access to the second portion of the memory according to the second order of the second dimensions.

23 Claims, 9 Drawing Sheets

APPARATUS AND METHOD FOR ACCESSING NON-OVERLAPPING PORTIONS OF MEMORY ACCORDING TO RESPECTIVE ORDERS OF DIMENSIONS

CROSS-REFERENCE TO RELATED APPLICATIONS

The present disclosure is a continuation of U.S. patent application Ser. No. 13/826,665 (now U.S. Pat. No. 8,621, 181), filed Mar. 14, 2013, which is a continuation of U.S. patent application Ser. No. 12/903,055 (now U.S. Pat. No. 8,402,249), filed on Oct. 12, 2010. This application claims the benefit of U.S. Provisional Application No. 61/253,019 filed on Oct. 19, 2009. The entire disclosures of the applications referenced above are incorporated herein by reference.

FIELD

Aspects of the present disclosure relate generally to dynamically partitioning a physical memory device into non-overlapping regions, where each region corresponds to a particular application and the memory mapping mode used for each region is associated with the application.

BACKGROUND

In modern computer systems, system addresses must be mapped to physical memory addresses so that the system can access the memory. Generally, system addresses are linear while, for example, synchronous dynamic random access memory (SDRAM) addresses are three-dimensional. Various modes map a system address to an SDRAM device's physical memory address; these modes include row-bank-column and bank-row-column. Each mode has its own advantages and disadvantages. For example, mappings calculated according to row-bank-column may be useful for applications that need to cross page boundaries (e.g., video decoding), while mappings calculated according to bank-row-column may be most effective for applications that generally do not need to cross page boundaries (e.g., a general-purpose processor making short accesses of the memory). In current SDRAM-based systems, only one mode can be supported in a single SDRAM device at any one time.

Therefore, it may be desirable to provide a system and method that flexibly can access a single physical memory device according to at least two memory mapping modes simultaneously.

SUMMARY

A system is provided and includes a register and a controller. The register is configured to store a map relating distinct regions of a memory to respective mapping modes. Each of the mapping modes identifies a predetermined order of dimensions of a respective region of the memory. Each of the dimensions of the regions of the memory is identified as a row, a bank, or a column. The mapping modes include (i) a first mapping mode having a first predetermined order of dimensions, and (ii) a second mapping mode having a second predetermined order of dimensions that is different from the first predetermined order of dimensions associated with the first mapping mode. The controller is configured to control access to the distinct regions of the memory according to the map stored in the register, including controlling access to a first region of the memory according to the first mapping mode while controlling access to a second region of the memory according to the second mapping mode.

A method is provided and includes generating a map. The map relates distinct regions of a memory to respective mapping modes. Each of the mapping modes identifies a predetermined order of dimensions of a respective region of the memory. Each of the dimensions of the regions of the memory is identified as a row, a bank, or a column. The mapping modes include (i) a first mapping mode having a first predetermined order of dimensions, and (ii) a second mapping mode having a second predetermined order of dimensions that is different from the first predetermined order of dimensions associated with the first mapping mode. The map is stored in a register. Access to the distinct regions of the memory is controlled according to the map stored in the register including controlling accessing a first region of the memory according to the first mapping mode while controlling accessing a second region of the memory according to the second mapping mode.

Embodiments described herein provide systems and methods that enable the partitioning of physical memory into non-overlapping regions of contiguous physical memory addresses, such that each region may be programmed dynamically and independently according to different memory mapping modes, depending on real-time requirements of the system.

In accordance with one aspect of the disclosure, a system includes a physical memory device, a mapping register configured to maintain a memory mapping mode for each of multiple regions within the physical memory device (where each region is associated with a contiguous portion of physical memory addresses associated with the physical memory device that does not overlap with any other region) and a memory controller configured to control access to and from the physical memory device according to the mapping register.

The mapping register may be configured to maintain a memory mapping scheme for each region, where the memory mapping scheme is based at least on the memory mapping mode.

The physical memory device may be a synchronous dynamic random access (SDRAM) device, and the memory mapping mode may be based on a combination of bank, row and column values. In a further embodiment, the memory mapping mode may be one of either bank-row-column (BRC) or row-bank-column (RBC).

The mapping register may be configured to maintain a refresh status variable for each region to determine whether the region will be refreshed.

In accordance with another aspect of the disclosure, a method of mapping system addresses to physical addresses associated with a physical memory device is disclosed. For each of multiple applications, the method receives memory requirements associated with the application, allocates a region of the physical memory device to the application (where the region is a contiguous portion of the physical addresses that does not overlap with any other region and is associated with a memory mapping mode), determines a memory mapping scheme for the region (where the memory mapping scheme defines the mapping between system addresses and the region and is based at least on the memory mapping mode) and modifies a mapping register to reflect the region.

The mapping register may be modified to reflect the memory mapping scheme.

The memory requirements may include an application type, and the mapping mode may be determined based on the application type.

In an embodiment, the memory mapping mode may be based on a combination of bank, row and column values in a synchronous dynamic random access memory (SDRAM) device. In a further embodiment, the memory mapping mode may be one of either bank-row-column (BRC) or row-bank-column (RBC).

In an embodiment, the method may enable the refresh for each region.

DESCRIPTION

Figure 1:
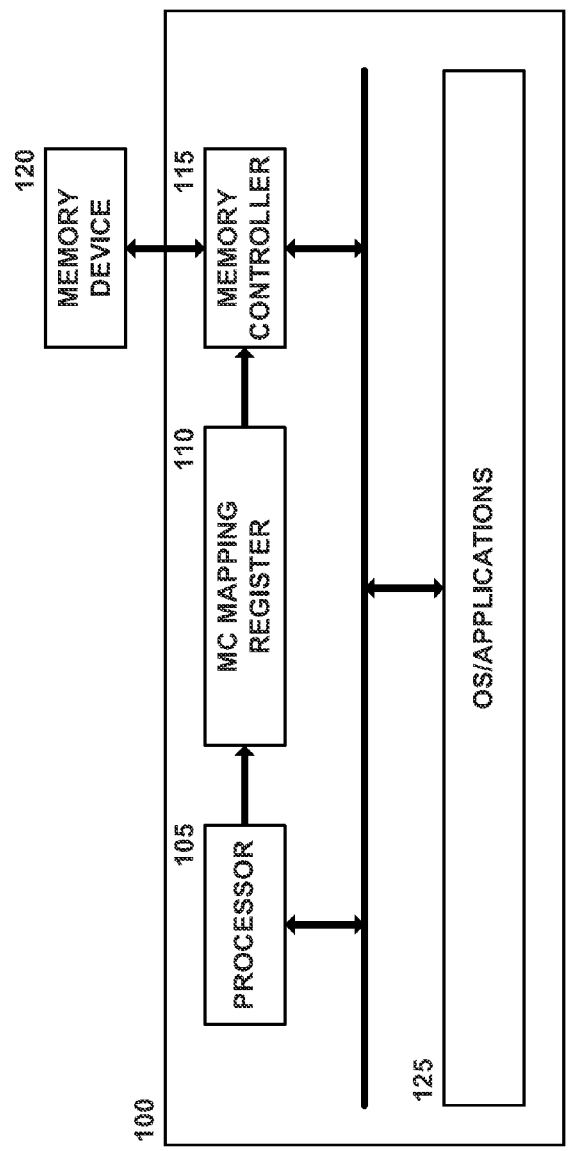
FIG. 1 is a simplified high level functional block diagram of a generalized system according to an embodiment.

Embodiments described herein allow multiple memory mapping modes to be used simultaneously and changed dynamically, thereby potentially resulting in faster access times, faster data transfer, lower latency and/or reduced power requirements (because, e.g., refreshing can be done more efficiently, and fewer accesses of the memory may be required for read/write operations). Generally, embodiments described herein may enable the partitioning of physical memory into non-overlapping regions of contiguous physical memory addresses. Each region may be programmed dynamically and independently according to different memory mapping modes, depending on real-time requirements of the system. Also, refresh of a particular region may be enabled/disabled independently, regardless of the memory mapping mode used. Refresh actions generally draw a lot of current in the system; by disabling refresh of one or more regions (when possible), the system's power requirements may be reduced.

Typically, a computer system's operating system (OS), applications executed by the computer system and data used by the applications are loaded partially or entirely into memory. It will be understood by those of skill in the art that "applications" or "programs" as used herein correspond generally to sequences of instructions executed by the computer system and are used to perform one or more specific tasks; examples include word processing software, video coding/decoding software, system utilities required by the OS, web browsers, email clients, etc. The memory generally is in the form of synchronous dynamic random-access memory (SDRAM) and is made accessible to the computer system via a memory mapping scheme that translates logical or system addresses referenced by the system's operating system into the physical addresses used by the memory controller, and vice versa.

An SDRAM device address is configured in banks (B), rows (R) and columns (C), generally treated as a three-dimensional array. System addresses usually are linear (one-dimensional). As a result, in order for the system to access and use the physical memory, it is necessary to provide a mapping scheme between the two addressing protocols. Accordingly, an SDRAM address generally can be thought of as a function of a system address (A); i.e., $B=F_0(A)$, $R=F_1(A)$ and $C=F_2(A)$.

Memory mapping modes include RBC (row-bank-column) and BRC (bank-row-column). With RBC, a number of most significant bits of a system address may be mapped to the row (R), a number of least significant bits may be mapped to the column (C) and the remaining bits in between may be mapped to the bank (B). With BRC, a number of most significant bits of a system address may be mapped to the bank (B), a number of least significant bits may be mapped to the column (C) and the remaining bits in between may be mapped to the row (R). It will be appreciated that the number of bits used to represent R, B and C may depend on the size of the memory, the size of the address space, etc., and that, in some instances, certain of the same bits may be used for both R and B (or any other combination). For example, it may be the case that the 10 most significant bits are used for both R and B, in which case the value represented by those bits may have a first function applied to it to determine R (e.g., value/7) and a second function to determine B (e.g., value mod 7).

Turning now to the drawings, FIG. 1 is a simplified high level functional block diagram of a generalized system according to an embodiment. System 100 may include processor 105 (including, for example, microprocessors, microcontrollers, digital signal processors, etc.) that may execute the instructions of a computer program, OS and one or more applications 125, physical memory device 120 that may provide memory for system 100, memory controller (MC) mapping register 110 that may hold configuration information for portions of memory device 120, and memory controller 115 that may manage the flow of data going to and from memory device 120. While shown in FIG. 1 as separate from memory controller 115, MC mapping register 110 may be a part of memory controller 115.

It will be appreciated that embodiments of the disclosure are not limited to systems with the layout illustrated in FIG. 1, and generally may be practiced in any system that uses at least the elements listed above with respect to FIG. 1, including system-on-a-chip (SoC) systems, which generally integrate most components of a computer or other electronic system into one or more integrated circuits on a chip.

A computer system usually has varying memory requirements, depending on the type of application(s) currently accessing the memory. For example, a central processing unit (CPU) generally accesses and uses physical memory in a manner that is different from the way, say, a high definition (HD) video decoder might—each application, etc. exhibits a different access pattern. If the memory mapping mode used to map system addresses to physical memory addresses is, for example, bank-row-column (BRC), then CPU(-type)

accesses may be able to take advantage of the mapping, but HD decoding may suffer (because row-bank-column (RBC) may be more efficient for this type of application).

The pros and cons regarding BRC and RBC mapping modes are known in the art. BRC generally works well for partial bank operations, e.g., partial bank refresh/self-refresh, which can help to lower power consumption. (Refresh operations generally require a lot of power.) Similarly, BRC generally is preferable for linear accesses (e.g., a CPU making short accesses). BRC also may be preferred for segment operations, i.e., where different applications in the system can use independent physical banks without page open/close interference between them. Generally, it is preferable to use BRC for accesses that do not cross page boundaries.

Downsides of BRC can include unbalanced bank access whereby some banks may be busy while others may be almost idle, etc.; if there is heavy access on one portion of the memory and everything is mapped to that portion, then the system may experience increased congestion. Also, there generally is a large penalty for cross-page accesses, i.e., accesses to different rows within the same bank. Each time a page has to be crossed, the row has to switch, so the entire row must be closed and then opened again, thus there is a precharge penalty and an open penalty, which can result in a delay.

RBC generally provides more balanced access to all the banks, thus it usually can more efficiently use multi-bank techniques to improve page hit-rates and access performance (e.g., via better bus utilization and lower access latency). Also, there generally is less of a penalty for cross-page accesses (i.e., accessing different banks). Generally, RBC is preferable for accesses that may need to cross page boundaries.

Problems with RBC can include access being scattered across all banks, so when there is access across multiple pages, multiple banks need to be accessed, which may make partial bank refreshes/self-refreshes difficult.

It will be appreciated that while BRC and RBC memory mapping modes are discussed herein with respect to some embodiments, in certain embodiments other known memory mapping modes may be used, including, for example, variations of RBC and BRC.

Throughout this disclosure, the examples and figures discussed assume a single 128 megabyte (MB) double data-rate (DDR) SDRAM device with a 32-bit interface, though it will be understood by those of skill in the art that larger or smaller memory devices with varying specifications may be supported, including devices that use other SDRAM standards, such as DDR2, DDR3, etc. A DDR device with a 32-bit interface may have eight banks, 8192 rows (per bank) and 512 columns (per row). Given that the examples used throughout this disclosure assume a 128 MB DDR device, each of the 8192 rows corresponds to 2 kilobytes (KB) of memory (i.e., a 2 KB page size); thus, each of the eight banks corresponds to 16 MB of memory. Accordingly, in BRC memory mapping mode, there may be a latency penalty when crossing the 2 KB boundary, whereas with RBC there is no latency penalty when crossing the 2 KB boundary. Also, with BRC, 16 MB of memory may be accessed before a bank switch is required, but with RBC, just 2 KB of memory may be accessed before a bank switch is required.

Given the exemplary constraints outlined above (i.e., a 128 MB DDR device with eight banks, 8192 rows per bank and 512 columns per row), the memory may be partitioned into a maximum of 65,536 regions (8 banks×8192 rows); i.e., where each row is a region. The maximum value is noted simply to highlight the potential utility of multiple, configurable regions; a typical configuration may include 8 regions (with 1 bank per region).

In one aspect of the embodiments described herein, system addresses are linear and the address space of the memory spans 27 bits, so that the address space may be referred to as A[26:0]. In this case, given all of the previous assumptions, BRC mapping across the entire memory (as may be done with known systems) may be as follows: B[2:0]=A[26:24], R[12:0]=A[23:11] and C[8:0]=A[10:2]. Similarly, RBC mapping (across the entire memory) may be as follows: R[12:0]=A[26:14], B[2:0]=A[13:11] and C[8:0]=A[10:2]. Other mappings for linear system addresses and 27-bit memory address spaces also are possible. Likewise, the disclosure is applicable to other configurations of system addresses and address spaces, giving rise to other relationships.

Figure 2:
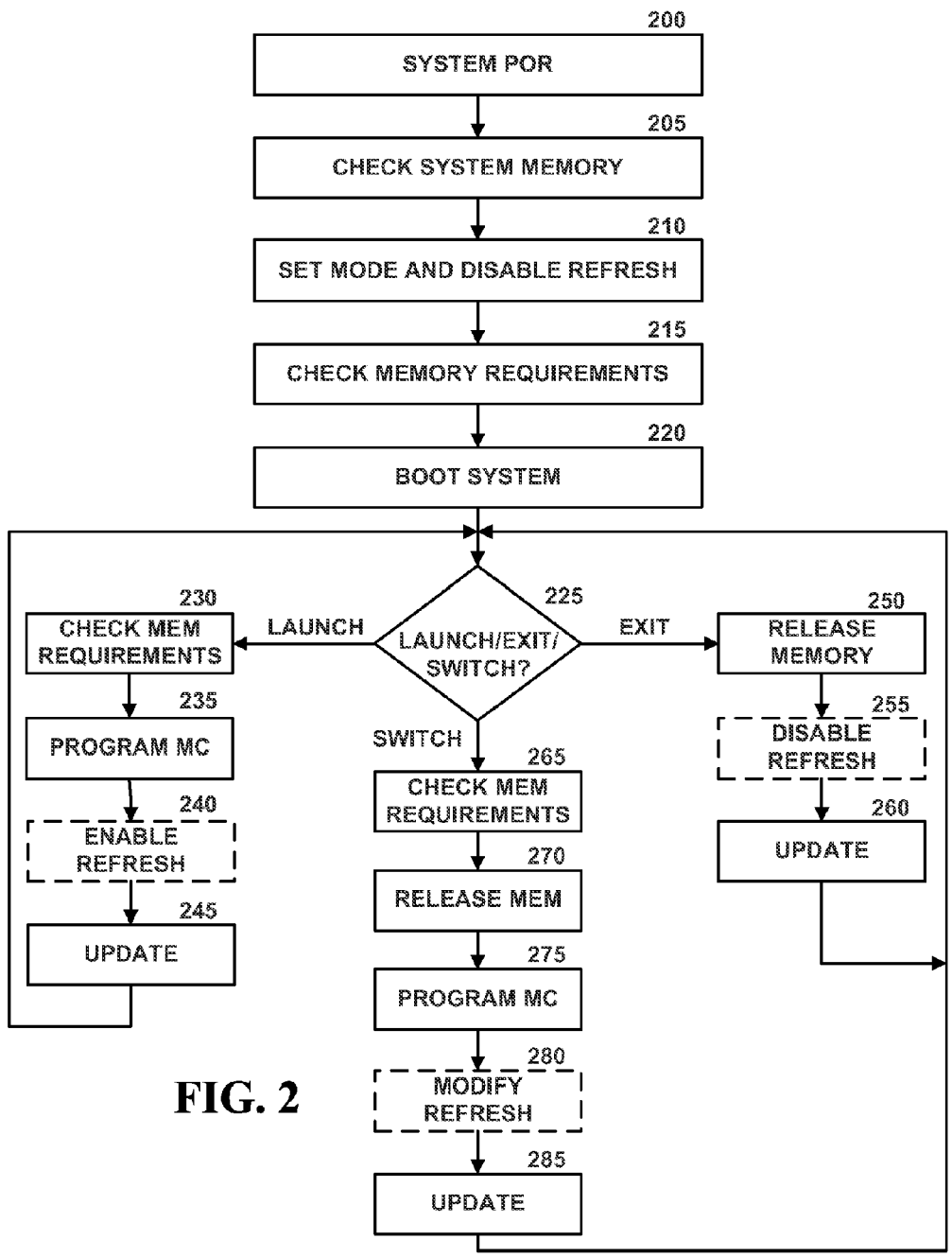
FIG. 2 is a simplified flow diagram illustrating operation of one embodiment of a method of dynamically controlling memory allocation and memory mapping mode.

FIG. 2 is a simplified flow diagram illustrating operation of one embodiment of a method of dynamically controlling memory allocation and memory mapping modes. At 200, system 100 may implement a power on reset (PoR) process, whereby system 100 may be powered on and at which point various start-up routines may be executed. At 205, system 100 may determine the size of DDR device 120. A check then may be made of the maximum number of memory regions memory controller 115 can recognize and use. Generally, the size of MC mapping register 110 will correspond to the number of regions memory controller 115 can support. For example, if MC mapping register 110 has 8 registers, then memory controller 115 may be able to support 8 regions—one region per register.

Next during PoR, at 210, the memory available at DDR device 120 may be set to a single type (e.g., BRC, RBC, etc.) and refresh may be disabled for all eight regions. At 215 a check of the memory requirements for boot, application and system software (including the OS), etc. may be performed, and the system may be booted at 220. It will be appreciated that generally, in a SoC-type system, the values "determined" by the hardware/system initialization steps performed at 205-20 will be pre-defined (e.g., before the system is powered on, it may already be pre-determined that the OS, boot, etc. will need 16 MB, be set to BRC memory mapping mode and use bank 0).

At 225, after system 100 boots, the operating system (OS) residing within system 100 may monitor application launches, exits and modified memory requirements. At this point the OS may be aware of the size of DDR device 120 and the number of regions MC mapping register 110 can support. The memory requirements of an application may be determined substantially concurrently with the application's launch, as illustrated at 230, and the application may inform the OS of these requirements.

At 235, the OS may call a memory management function to allocate the memory needed for the application. The memory management function may take certain arguments, including the amount of memory needed and either the type of application requesting the memory or the memory mapping mode desired by the application (e.g., an HD video coding application might request RBC mode). Generally, these values will be a part of the information that may be supplied by the application at 230. If the application's type (e.g., video encoder, video decoder, network monitor, etc.) is being used to inform the memory management function (i.e., instead of the application specifying a particular memory mapping mode), then a table (or similar structure), accessible to the memory management function, that defines the type of memory mapping mode to be used for that particular application type, may be used to determine the memory mapping mode.

Next, the memory management function may allocate to the application a region corresponding to a contiguous block of physical memory addresses. A mapping scheme may be calculated to map system addresses to the physical addresses within the region. The memory management function may update MC mapping register 110 to reflect the new region, including the span of system addresses that map into the region (e.g., A[26:0]<16 MB), the mapping scheme calculated for the region (e.g., the BRC scheme discussed with respect to FIG. 5), the mode to be used for the region (e.g., BRC), and if warranted (see discussion of 240 below), the refresh status for the region. It will be appreciated that MC mapping register 110 may be updated in real-time as decisions are made regarding mapping information and refresh statuses. It will be further appreciated that in some embodiments, the mapping scheme need not be saved to MC mapping register 110, but instead may be calculated in real-time as needed, saved separate from memory controller 115 and accessed by a device driver as needed, etc.

At 240, refresh for the region to be used by the application may be enabled so that the data within the bank(s) of that region can be maintained during operation of the application. As discussed above, the purpose of controlling the refresh associated with a region is to save power; if a bank currently is unused, there may be no reason to continually refresh it. It will be appreciated that the refresh at 240 need not always occur; indeed, it may be skipped altogether (e.g., in the case where power usage is not a concern, etc.), and so the refresh at 240 is shown in phantom.

At 245, the memory management function may report to the OS that the updating of MC mapping register 110 was successful, and the OS may update its memory allocation table to reflect the now-allocated memory. The OS then may report this information to the application that requested the memory; at this point the application will know the system addresses of the memory allocated for it and may begin to access this memory.

While an application is running it may recalculate its memory requirements at 265, and may conclude, for example, when it switches from doing one type of task to another, that its memory requirements have changed. At 270 the application may inform the OS of the modified memory requirements, and the OS may call the memory management function to release the memory the application currently is using. At 275, the memory management function may update MC mapping register 110 to reflect the new region. At 280, refresh may be enabled for the new region (if it is not already enabled) and may be disabled for any portions of unused memory. At 285, the memory management function may inform the OS that the updating of MC mapping register 110 was successful, and the memory allocation table may be updated to reflect the now-allocated memory. The OS then may report this information to the application requesting the memory; at this point the application will know the system addresses of the memory allocated for it and may begin to access it.

When an application exits and informs the OS at 225, the OS, at 250 may call the memory management function to release the memory that was allocated by the application. At 255, refresh may be disabled for the region corresponding to the now-unassigned memory. At 260, the memory management function may inform the OS that its operations have completed, and the memory allocation table may be updated to reflect the now-available memory.

It will be appreciated that a device driver associated with memory controller 115 may be used to carry out some of the operations described above with respect to FIG. 2. As is known in the art, a device driver generally is software that allows higher-level computer programs (e.g., an OS) to interact with a hardware device (e.g., DDR device 120). The device driver ultimately may decide the mapping between the system addresses and the physical memory (including the memory mapping mode if not provided by the application). Consequently, the device driver generally will be specific to DDR device 120 and the operating system used by system 100.

Figure 3:
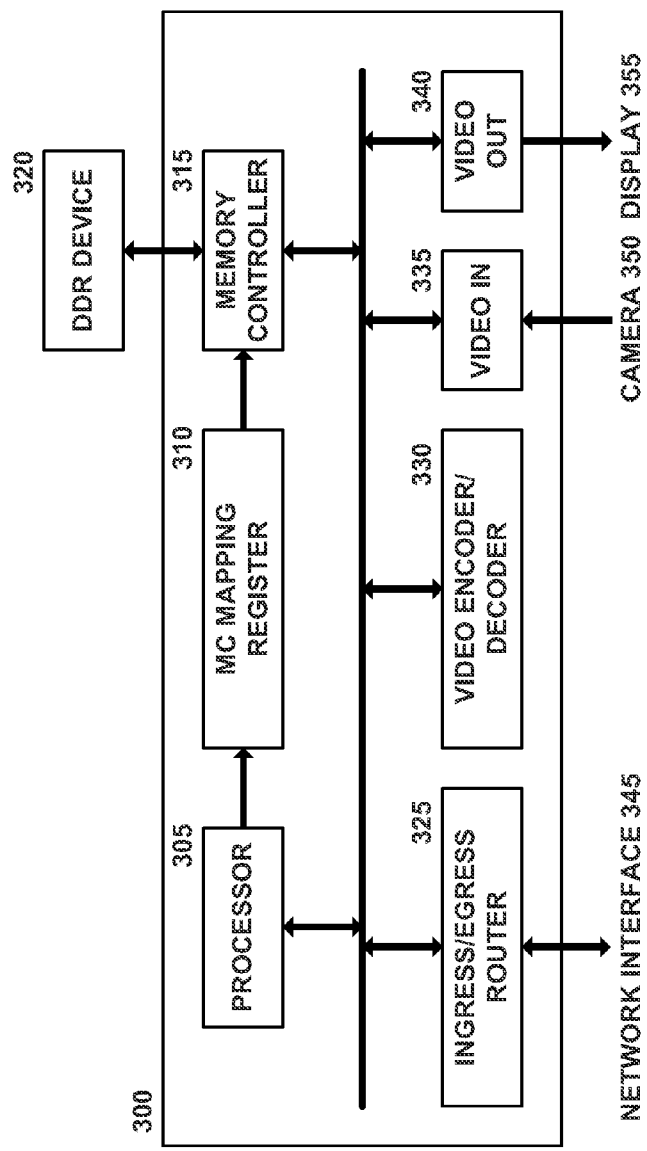
FIG. 3 is a simplified high level functional block diagram of a video server system according to an embodiment.

FIG. 3 is a simplified high level functional block diagram of a video server system according to an embodiment. It will be appreciated that FIG. 3 is similar to FIG. 1, except that applications 125 of system 100 have been specified as ingress/egress router 325, video encoder/decoder 330, video-in 335 and video-out 340, and network interface 345, camera 350 and display 355 have been added. Video server 300 may be capable of acting as both an input and output video server. When performing as a video-out server, raw video may be received through video-in 350, encoded via video encoder/decoder 330, packetized by ingress/egress router 325 and then served through network interface 345. Conversely, when performing as a video-in server, packetized video may be received by network interface 345 and ingress/egress router 325, decoded by video encoder/decoder 330 and sent to video-out 340 to be displayed by a display device 355 in communication with system 300. Video server 300 may be capable of handling video-in and video-out functions independently and in parallel.

Figure 4A:
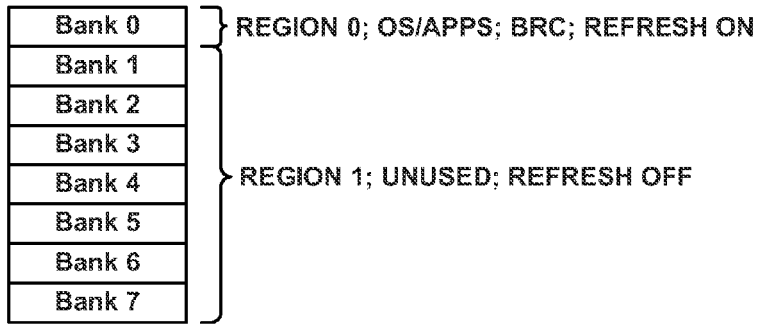
FIGS. 4A-C are simplified high level illustrations of memory allocations and memory mapping modes for a memory device.

Using FIG. 2 as a general guide, the following is a simplified example of video server 300 operating according to an embodiment. For purposes of explanation only, and to tie in with earlier discussion, it is assumed that DDR device 320 is a single, 128 MB, 32-bit DDR device. At 200, a PoR routine may begin for video server 300. It is determined, at 205, that the size of DDR device 320 is 128 MB, and that memory controller 315 can recognize and use up to 8 regions. Next, at 210, all banks of DDR device 320 may be set to BRC mode. At 215, it may be determined that 16 MB of memory is required for the boot-up sequence, application software, etc.; accordingly, region 0 (i.e., bank 0, OMB-16 MB) may be allocated for this purpose. Refresh for bank 0 may be enabled and refresh for banks 1-7 may remain disabled. FIG. 4A illustrates a sample memory allocation for DDR device 320 after functions 200-220 have been executed.

Once video server 300 completes its boot process at 220, it may begin to monitor for application launches and exits, as shown at 225. At 230, a video server application may be launched, which may spawn four "sub"-applications (e.g., threads of the video server application, etc.): ingress and egress router 325, video encoder/decoder 330, video-in 335 and video-out 340. For each of the four sub-applications, 230-245 may be executed, and memory controller 315 ultimately may be programmed as follows (and these values may be reflected in MC mapping register 310):

(1) 16 MB (e.g., region 0, bank 0, addresses OMB-16 MB) allocated for the operating system and application software, mapped using BRC memory mapping mode with refresh enabled for region 0;

(2) 16 MB (e.g., region 1, bank 1, addresses 16 MB-32 MB) allocated for ingress and egress router 325, mapped using BRC memory mapping mode with refresh enabled for region 1;

(3) 48 MB (e.g., region 2, banks 2-4, addresses 32 MB-80 MB) allocated for video encoder/decoder 330, mapped using RBC memory mapping mode with refresh enabled for region 2; and (4) 48 MB (e.g., region 3, banks 5-7, addresses 80 MB-128 MB) allocated for a video buffer to be used by video-in 335 and video-out 340, mapped using RBC memory mapping mode with refresh enabled for region 3.

Figure 4B:
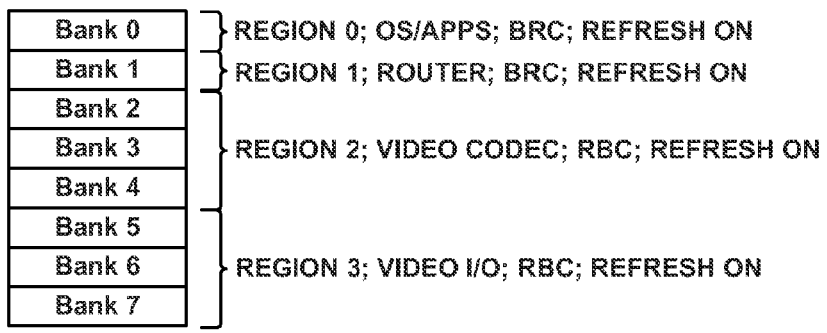

FIG. 4B illustrates a sample memory allocation for DDR device 320 after 230-245 have been executed for each of the four sub-applications.

According to an embodiment, as described previously with reference to 265-285 of FIG. 2, an application may inform the OS of its memory requirements during its operation, and not just at launch/exit. During operation, the video server application may switch from HD mode with streaming, to dual-standard definition (SD) mode (with no router and no streaming), whereby video server 300 will process two independent video channels simultaneously.

When the video server application switches modes it may recalculate its memory requirements at 265, and may conclude, for example, that each SD channel needs 16 MB for video encoder/decoder 330 and 16 MB to buffer video-in 335 and video-out 340. At 270 the video server application may inform the OS of the updated memory requirements, and the OS may call the memory management function to release the memory the video server application currently is using (i.e., regions 1-3, banks 1-7, addresses 16 MB-128 MB). At 275, the memory management function may update MC mapping register 110 to reflect the new region. Accordingly, per the example requirements discussed above, 32 MB of DDR device 320 may be allocated for the first SD channel (e.g., region 1, banks 1-2, addresses 16 MB-48 MB), mapped using the RBC memory mapping mode with refresh enabled for region 1; and 32 MB may be allocated for the second SD channel (e.g., region 2, banks 3-4, addresses 48 MB-80 MB), mapped using the RBC memory mapping mode with refresh enabled for region 2. Refresh for region 3 (i.e., banks 5-7) may be disabled because that memory (i.e., addresses 80 MB-128 MB) is not currently being used.

Figure 4C:
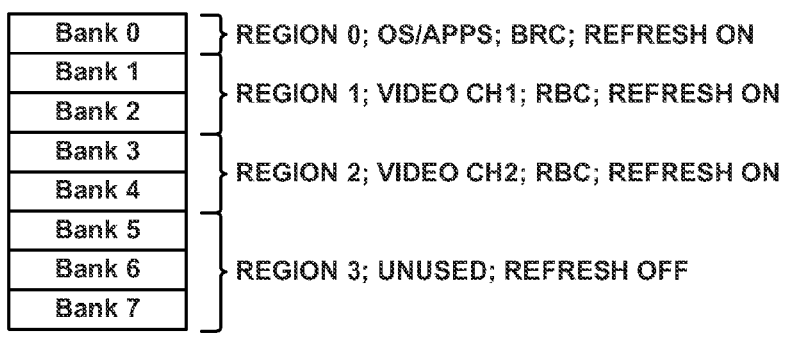

At 285, the memory management function may inform the OS that the updating of MC mapping register 110 was successful, and the memory allocation table may be updated to reflect the now-allocated memory. The OS then may report this information to the sub-applications; at this point the sub-applications will know the system addresses of the memory allocated for each of them and may begin to access it. FIG. 4C illustrates a sample memory allocation for DDR device 320 after 265-285 have been executed.

When the video server application exits it may inform the OS of its closing at 225. The OS, at 250, may call the memory management function to release the memory that was allocated by the application (e.g., after the switch operation discussed above, banks 1-4, addresses 16 MB-80 MB). At 255, the memory management function may disable refresh of the banks within the regions previously used by the video server application. At 260 the memory management function may inform the OS that the updating of MC mapping register 110 was successful, and the memory allocation table may be updated to reflect the now-available memory. After 250-260 have executed, the physical memory allocation may look as it did in FIG. 4A, namely region 0 (i.e., bank 0) is allocated to the OS, etc., and region 1 (i.e., banks 1-7) are unused.

FIGS. 5-9 are simplified high-level illustrations of a DDR device programmed according to various embodiments. It will be understood that these illustrations are just examples, and that there may be a practically limitless number of possible configurations, depending on the size of the memory, the number of regions supported and the current requirements of applications that are accessing the memory.

Figure 5:
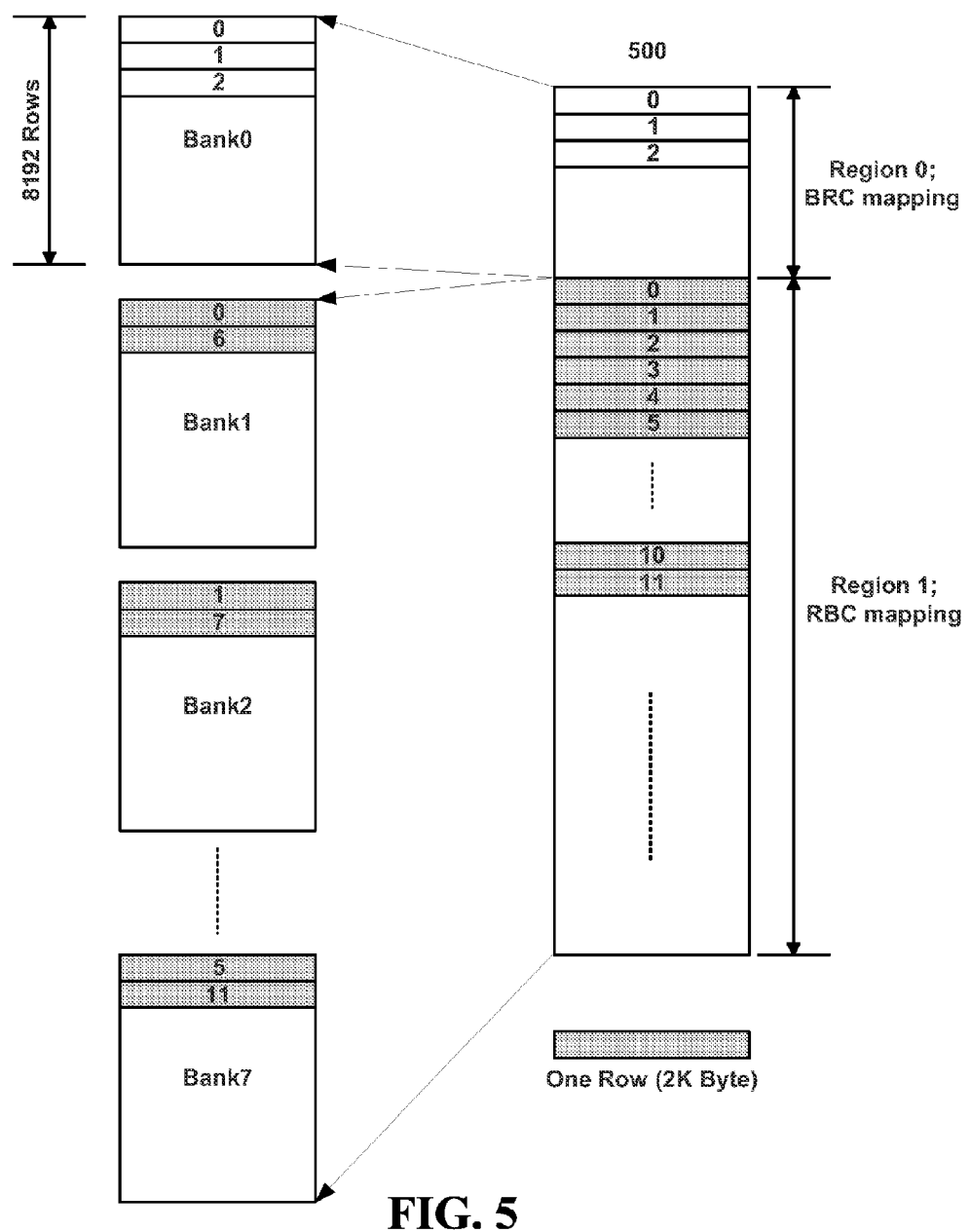
FIG. 5 is a simplified high-level illustration of a DDR device programmed for mixed BRC and RBC memory mapping modes.

FIG. 5 is a simplified high-level illustration of a DDR device 500 programmed for mixed BRC and RBC memory mapping modes. In an example situation in which a user of video server 300 begins streaming video content via network interface 345, according to the steps previously discussed with regard to FIG. 2, the memory may be remapped to take advantage of the access nature of video decoding (e.g., RBC may be most efficient). In this case, for example, assume that 16 MB of memory needs to be allocated for general application and CPU access (in this example, the 16 MB of memory may correspond to A[26:0]<16 MB), while 112 MB is needed for the streaming video (in this example, the 112 MB may correspond to A[26:0]≥16 MB). Such a scenario limits the BRC mapping to its own bank (i.e., bank 0, region 0), and limits the RBC mapping to the next seven banks (i.e., banks 1-7, region 1). Accordingly, the BRC mapping scheme may be B=A[26:24], R=A[23:11] and C=A[10:2]; and the RBC mapping scheme may be B=(A[26:11]%7)+1, R=(A[26:11]/7) and C=A[10:2]. "7" may be used as the divisor and mod value in this particular example because the region to be used for RBC includes 7 banks (i.e., 112 MB). It will be appreciated that the mappings discussed above are just limited examples, and that, depending on the state and constraints of the system, the mappings may be different; for example, bank 0 may not always correspond to region 0, and instead may correspond to, for example, region 6. The same general caveat applies to the other embodiments described below.

Figure 6:
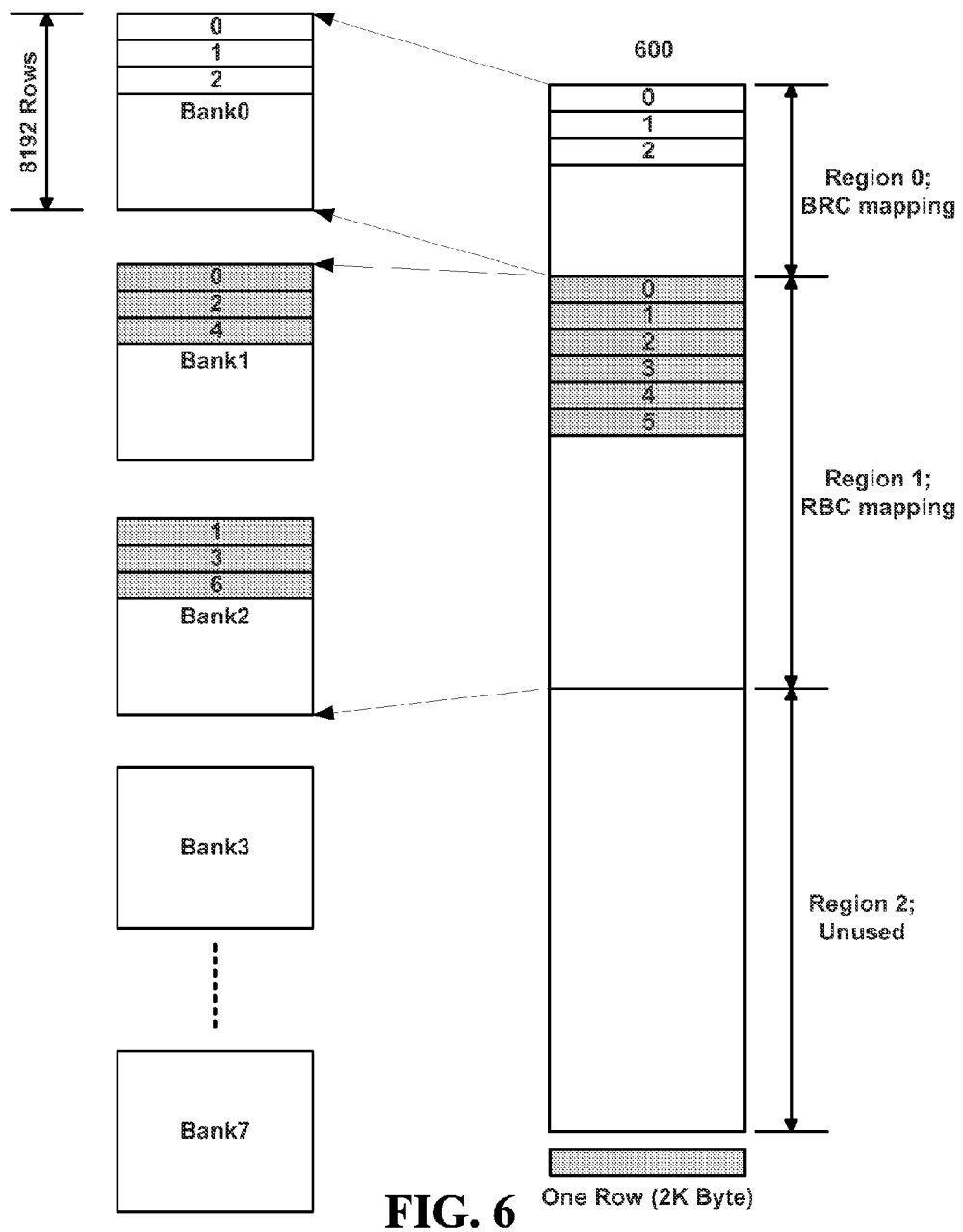
FIG. 6 is a simplified high-level illustration of a DDR device programmed for mixed BRC and RBC memory mapping modes with unused banks.

FIG. 6 is a simplified high-level illustration of a DDR device 600 programmed for mixed BRC and RBC memory mapping modes with unused banks. Again, if a user of video server 300 begins streaming video content via network interface 345, then according to the operations previously discussed with regard to FIG. 2, the memory may be remapped to take advantage of the access nature of video decoding (e.g., RBC may be most efficient). In this case, for example, assume that 16 MB of memory needs to be allocated to general application and CPU access (in this example, the 16 MB of memory may correspond to A[26:0]<16 MB), while 32 MB (instead of 112 MB, as in the last example) is needed for the streaming video (in this example, the 32 MB of memory may correspond to 48 MB≥A[26:0]≥16 MB). Such a scenario limits the BRC mapping to its own bank (i.e., bank 0, region 0), and limits the RBC mapping to the next two banks (e.g., banks 1-2, region 1). Accordingly, the BRC mapping scheme may be B=A[26:24], R=A[23:11] and C=A[10:2]; and the RBC mapping scheme may be B=(A[26:11]%2)+1, R=(A[26:11]/2) and C=A[10:2]. "2" may be used as the divisor and mod value in this particular example because the region to be used for RBC includes 2 banks (i.e., 32 MB). The region not in use, i.e., region 2 (banks 3-7) can be mapped according to any memory mapping mode, and refresh for banks 3-7 may be disabled.

As illustrated by FIG. 6, within the RBC region, when the page size is added to any system address, the resulting physical memory address will point to the next bank. For example, in the RBC region of FIG. 6, page 0 is mapped into bank 1, page 1 is mapped into bank 2, page 2 is mapped into bank 1, page 3 is mapped into bank 2, etc.

Figure 7:
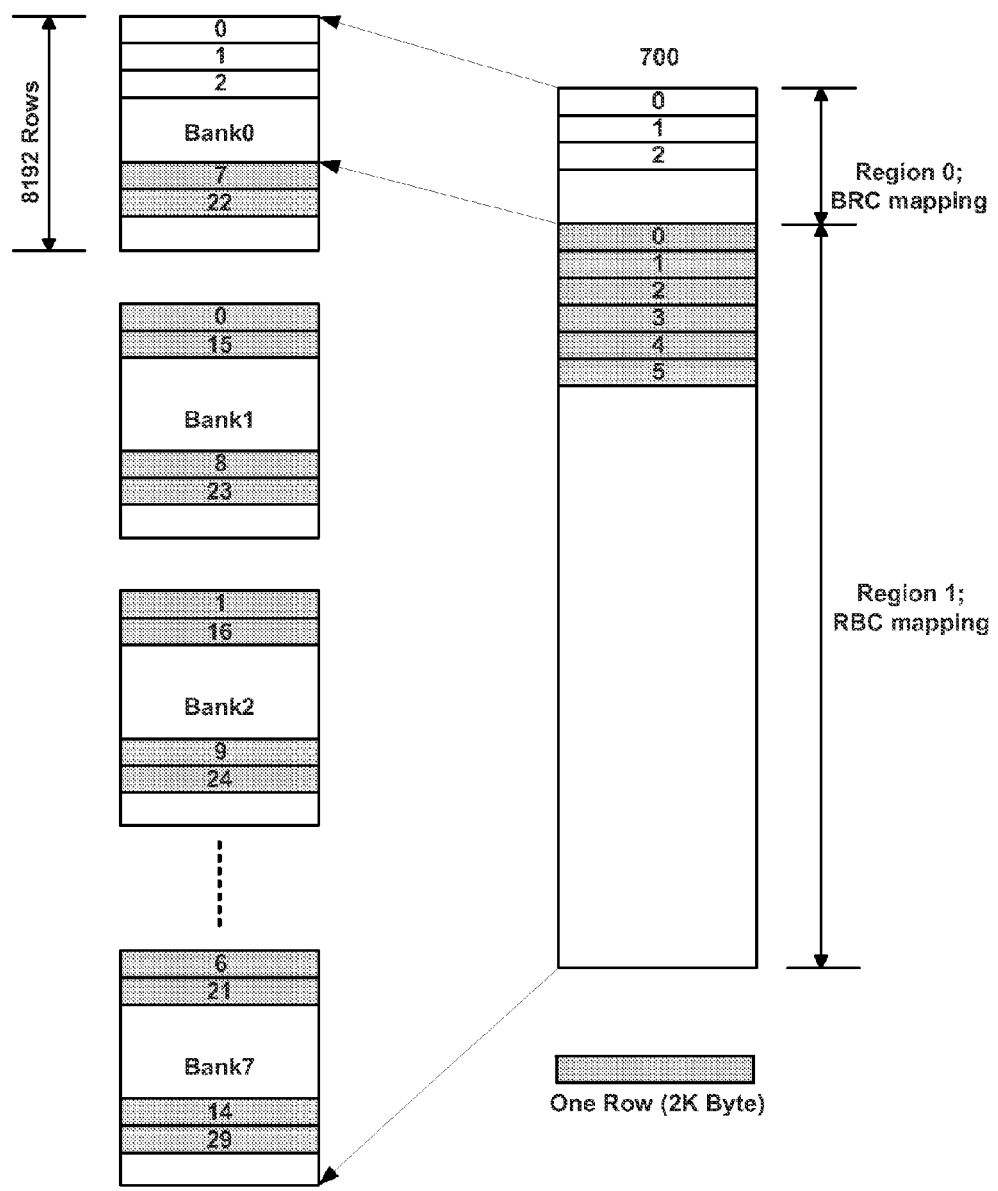
FIG. 7 is a simplified high-level illustration of a DDR device programmed for mixed BRC and RBC memory mapping modes and half-bank granularity.

FIG. 7 is a simplified high-level illustration of a DDR device 700 programmed for mixed BRC and RBC memory mapping modes with partial-bank granularity, such that a region's boundary can occur within a bank. In FIG. 7, region 0 is BRC mapped to the first half of bank 0 (i.e., rows 0-4095), and the remainder of the physical memory is RBC mapped to region 1 (i.e., the second half of bank 0, and banks 1-7). Partial-bank mapping granularity may correspond to any value that is a multiple of rows.

Figure 8:
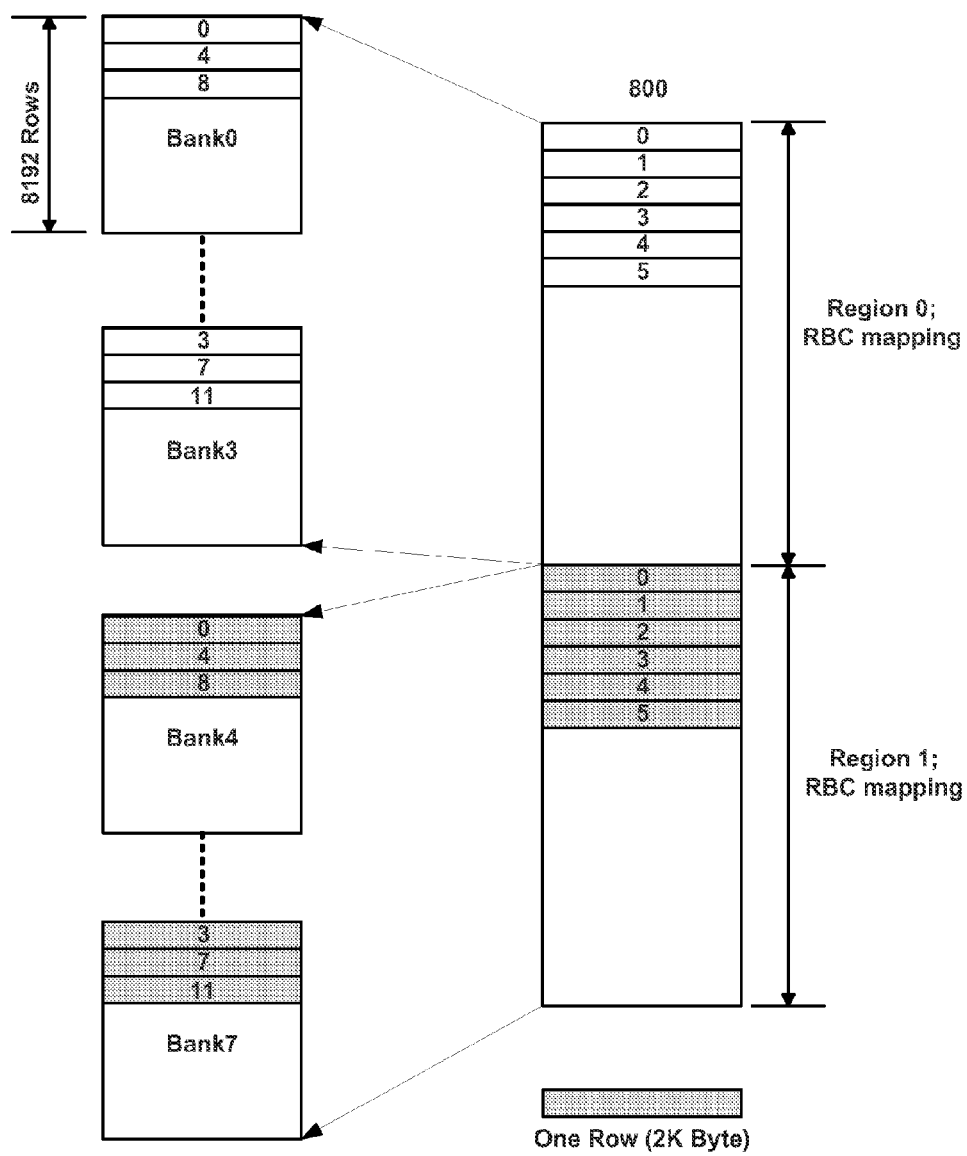
FIG. 8 is a simplified high level illustration of a DDR device programmed for segment RBC memory mapping mode.

FIG. 8 is a simplified high level illustration of a DDR device 800 programmed for segment RBC memory mapping mode. If a user of video server 300 is using two separate applications, each of which is streaming video content via network interface 345, then according to the steps previously discussed with regard to FIG. 2, the memory may be remapped to take advantage of the access nature of video decoding (e.g., RBC may be most efficient). In this case, for example, if it is assumed that 64 MB of memory is needed for each of the two video streaming applications, then two regions (each 4 banks; 64 MB)—one for each streaming application—may be created (in this example, the first 64 MB of memory may correspond to $0 \le A[26:0] < 64$ MB, and the second 64 MB may correspond to $64 \text{ MB} \le A[26:0] \le 128 \text{ MB}$). Accordingly, the RBC mapping scheme may be B={A[26], A[12:11]}, R=A[25:13] and C=A[10:2], and the opened pages of one video streaming application will not be closed by the other.

As illustrated by FIG. 8, within any RBC region, when the page size is added to any system address, the resulting physical memory address will point to the next bank. For example, in region 0 of FIG. 8, page 0 is mapped into bank 0, page 1 is mapped into bank 1, page 2 is mapped into bank 2 and page 3 is mapped into bank 3. A similar pattern can be seen in region 1. It will be appreciated that in segment RBC mode there can be multiple RBC regions, and not just the two shown in FIG. 8.

Figure 9:
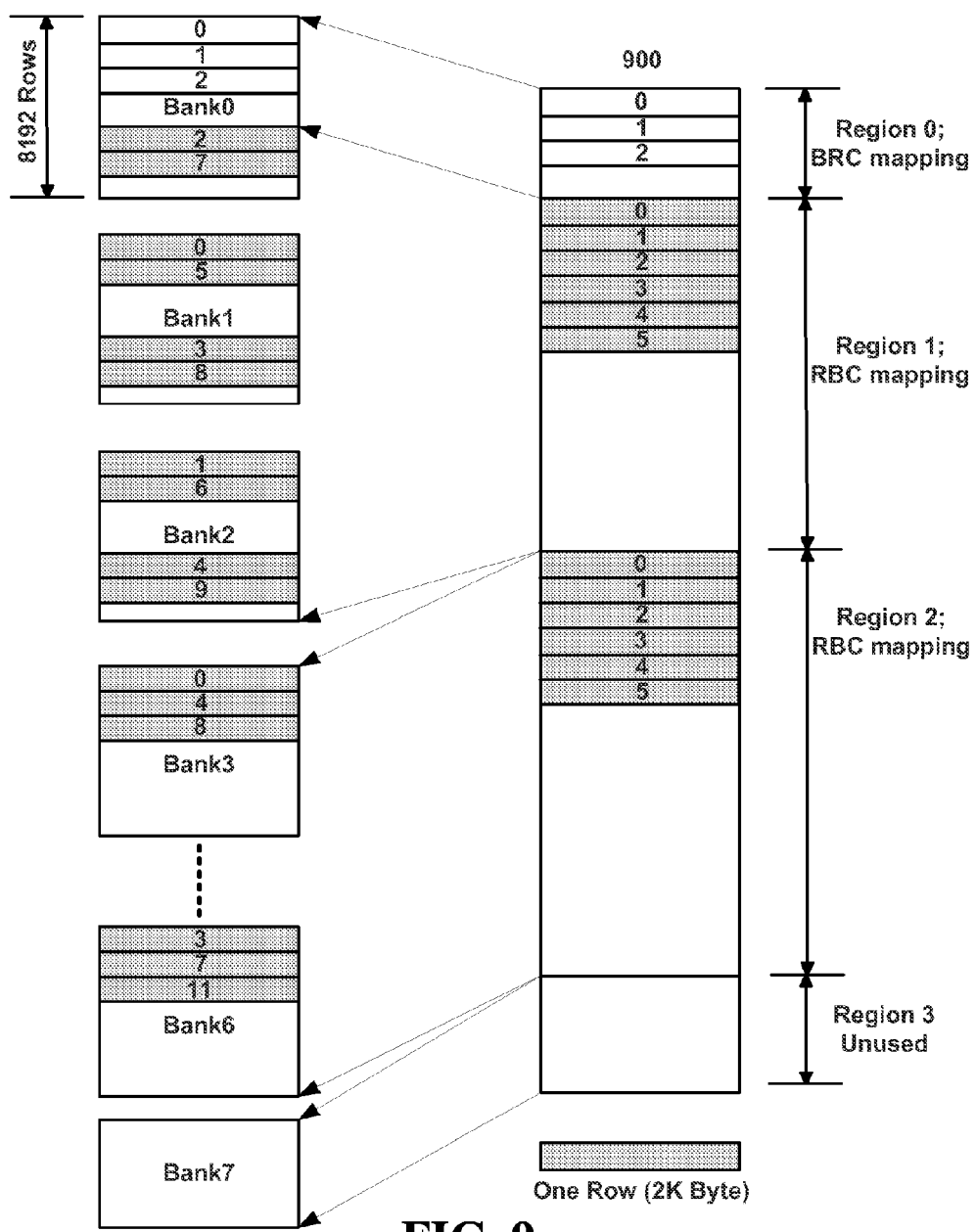
FIG. 9 is a simplified high-level illustration of a DDR device programmed for mixed BRC and RBC memory mapping modes, with segment RBC, half-bank granularity and unused banks.

FIG. 9 is a simplified high-level illustration of a DDR device 900 programmed to incorporate versions of all of the memory mappings described with respect to FIGS. 5-8, including mixed BRC and RBC, segment RBC, half-bank granularity and unused banks. The first half of bank 0 (region 0) uses BRC, the second half of bank 0 and banks 1-2 (region 1) use RBC, banks 3-6 (region 2) use RBC and banks 6-7 (region 3) are unused.

In accordance with the foregoing, the systems and methods described herein may be implemented in hardware, firmware, software or other instruction sets maintained in a non-transitory computer readable medium, or a combination of these. Generally, the systems and methods described herein may be integrated with or employed in conjunction with any system where multiple applications use the same physical memory device, especially where the multiple applications exhibit disparate access patterns.

Several features and aspects of the present disclosure have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the disclosure be considered as limited only by the scope of the appended claims.

What is claimed is:

1. A system comprising:
   a storage device configured to store a map, wherein
     the map relates (i) a first portion of a memory to a first order of first dimensions, and (ii) a second portion of the memory to a second order of second dimensions,
     the second order of the second dimensions is different than the first order of the first dimensions,
     the first portion of the memory and the second portion of the memory are non-overlapping, and
     each of the first dimensions and each of the second dimensions has a corresponding group of memory cells in the memory; and
   a controller configured to (i) determine the second order of the second dimensions based on the first order of the first dimensions, a divisor, and a modifier value, and (ii) access the first portion of the memory according to the first order of the first dimensions while accessing the second portion of the memory according to the second order of the second dimensions.

2. The system of claim 1, wherein the first portion of the memory includes different memory cells than the second portion of the memory.

3. The system of claim 2, wherein the first portion of the memory does not include memory cells in the second portion of the memory.

4. The system of claim 3, wherein the second portion of the memory does not include memory cells in the first portion of the memory.

5. The system of claim 1, wherein each of the first dimensions and each of the second dimensions has a corresponding row of memory cells, bank of memory cells, or column of memory cells.

6. The system of claim 1, wherein each of the groups of memory cells is a row of memory cells, a bank of memory cells, or a column of memory cells.

7. The system of claim 1, wherein:
   the map includes
     first values for the first order of the first dimensions, wherein the first values include a first row value, a first bank value, and a first column value, and
     second values for the second order of the second dimensions, wherein the second values include a second row value, a second bank value, and a second column value; and
   the controller is configured to control access to (i) the first portion of the memory according to the first row value, the first bank value, and the first column value, and (ii) the second portion of the memory according to the second row value, the second bank value, and the second column value.

8. The system of claim 1, wherein the controller is configured to allocate:
   a first number of banks of the memory to be included in the first portion of the memory for a first type of software application; and
   a second number of banks of the memory to be included in the second portion for a second type of software application,
   wherein the second type of software application streams more video data for a period of time than the first type of software application.

9. The system of claim 1, wherein the controller is configured to map:
   according to the first order of the first dimensions, a first system address to a first physical memory address in the first portion of the memory; and
   according to the second order of the second dimensions, a second system address to a second physical memory address in the second portion of the memory.

10. The system of claim 9, wherein the controller is configured to:
    map the first system address to the first physical memory address based on a first set of functions, wherein the first set of functions (i) relate bits of the first system address respectively to a first row value, a first bank value, and a first column value, and (ii) include a first row function, a first bank function, and a first column function; and map the second system address to the second physical memory address based on a second set of functions, wherein the second set of functions (i) relate bits of the second system address respectively to a second row value, a second bank value, and a second column value, and (ii) include a second row function, a second bank function, and a second column function.

11. The system of claim 10, wherein the controller is configured to:
map most significant bits of the first system address to a row of the first portion of the memory;
map least significant bits of the first system address to a column of the first portion of the memory;
map most significant bits of the second system address to a bank of the second portion of the memory; and
map least significant bits of the second system address to a column of the second portion of the memory.

12. The system of claim 1, wherein:
the controller is configured to (i) update amounts of the memory allocated to a plurality of software applications, and (ii) set refresh status variables for the first portion of the memory and the second portion of the memory; and
the storage device is configured to store the refresh status variables, wherein each of the refresh status variables indicates whether one of the plurality of software applications is using data stored in the first portion of the memory or the second portion of the memory.

13. The system of claim 1, wherein the controller is configured to:
receive first memory requirements for a first software application;
receive second memory requirements for a second software application;
allocate the first portion of the memory to the first software application based on the first memory requirements; and
allocate the second portion of the memory to the second software application based on the second memory requirements.

14. The system of claim 13, wherein the controller is configured to:
update the first memory requirements of the first software application during operation of the first software application;
prior to the allocating of the first portion of the memory to the first software application, releasing a third portion of the memory previously allocated for the first software application;
determining the first order of the first dimensions for the first portion of the memory; and
updating the first portion of the memory based on the first order of the first dimensions.

15. The system of claim 1, wherein:
the first portion of the memory and the second portion of the memory are allocated to a respective one of a plurality of devices, wherein the plurality of devices include an operating system, a router, a video encoder, and a video buffer; and
the controller is configured to (i) receive system addresses from the plurality of devices, and (ii) based on the first order of the first dimensions or the second order of the second dimensions, map each of the system addresses received from the plurality of devices to a physical memory address of the memory while mapping the other ones of the system addresses to physical memory addresses of the memory.

16. The system of claim 1, wherein the first portion of the memory and the second portion of the memory share a single bank of the memory.

17. The system of claim 1, wherein:
the first portion of the memory comprises a first bank;
the second portion of the memory comprises a first plurality of banks;
a third portion of the memory comprises a second plurality of banks;
the controller is configured to, according to the first order of the first dimensions, map first system addresses to a first half of the first bank; and
the controller is configured to, according to the second order of the second dimensions, map (i) second system addresses to a second half of the first bank, (ii) third system addresses to the first plurality of banks, and (iii) fourth system addresses to the second plurality of banks.

18. The system of claim 17, wherein:
a fourth portion of the memory comprises unused memory; and
the controller is configured to (i) enable refreshing of bits stored in the first portion of the memory, the second portion of the memory, and the third portion of the memory, and (ii) disable refreshing of bits stored in the fourth portion of the memory.

19. A method comprising:
determining a first order of first dimensions for a first portion of a memory;
determining a second order of second dimensions for a second portion of the memory based on the first order of the first dimensions, a divisor, and a modifier value, the second order of the second dimensions is different than the first order of the first dimensions;
storing a map, wherein
the map relates (i) the first portion of the memory to the first order of the first dimensions, and (ii) the second portion of the memory to the second order of the second dimensions,
the first portion of the memory and the second portion of the memory are non-overlapping, and
each of the first dimensions and each of the second dimensions has a corresponding group of memory cells in the memory; and
controlling access to the first portion of the memory according to the first order of the first dimensions while controlling access to the second portion of the memory according to the second order of the second dimensions.

20. The method of claim 19, further comprising:
controlling access to the first portion of the memory according to a first row value, a first bank value, and a first column value; and
controlling access to the second portion of the memory according to a second row value, a second bank value, and a second column value,
wherein
the map includes first values for the first order of the first dimensions, wherein the first values include the first row value, the first bank value, and the first column value,
the map includes second values for the second order of the second dimensions, wherein the second values include the second row value, the second bank value, and the second column value,
the first order of the first dimensions includes the first values in a row-bank-column order, and
the second order of the second dimensions includes the second values in a bank-row-column order.

21. The system of claim 1, wherein the controller is configured to:
   determine a first set of memory requirements for a first application and during launch of the first application;
   allocate the first portion of the memory for the first application based on (i) a type of the first application, and (ii) the first order of first dimensions;
   update a mapping register a first time to reflect a plurality of addresses of the first portion of the memory;
   determine a second set of memory requirements for a second application;
   allocate the first portion of the memory and a third portion of the memory for the second application based on (i) a type of the second application, and (ii) a third order of dimensions, wherein the third order of dimensions is different than the first order of dimensions; and
   update the mapping register a second time to reflect (i) a first address of the plurality of addresses of the first portion of the memory, and (ii) an address of the third portion of the memory.

22. The system of claim 1, wherein:
   the first order of the first dimensions is bank-row-column order;
   the second order of the second dimensions is a row-bank-column order;
   the controller is configured to (i) in accessing the first portion of the memory, access a first bank, a first row and a first column of the memory, and (ii) in accessing the second portion of the memory, access a second bank, a second row and the first column of the memory;
   the second bank is selected based on the modifier value; and
   the second row is selected based on the divisor.

23. The system of claim 15, wherein the controller is configured to:
   allocate the first portion of the memory to the operating system and the router;
   allocate the second portion of the memory to the video encoder and the video buffer;
   access the first portion of the memory according to the first order of first dimensions such that (i) a row of the memory is accessed subsequent to a bank of the memory, and (ii) a column of the memory is access subsequent to the row of the memory; and
   access the second portion of the memory according to the second order of the second dimensions such that (i) a second bank of the memory is accessed subsequent to a second row of the memory, and (ii) a second column of the memory is accessed subsequent to the second bank of the memory.

* * * * *